3,192,373
ELECTRIC DEVICE FOR FORMING A VOLTAGE PROPORTIONAL TO THE SQUARE OF A CURRENT
Walter Engel, Nurnberg, Germany, assignor to Siemens-Schuckertwerke Aktiengesellschaft, Berlin-Siemensstadt, Germany and Erlangen, Germany, a corporation of Germany
Filed Mar. 7, 1960, Ser. No. 17,723
Claims priority, application Germany, Mar. 12, 1959, S 62,111
4 Claims. (Cl. 235—194)

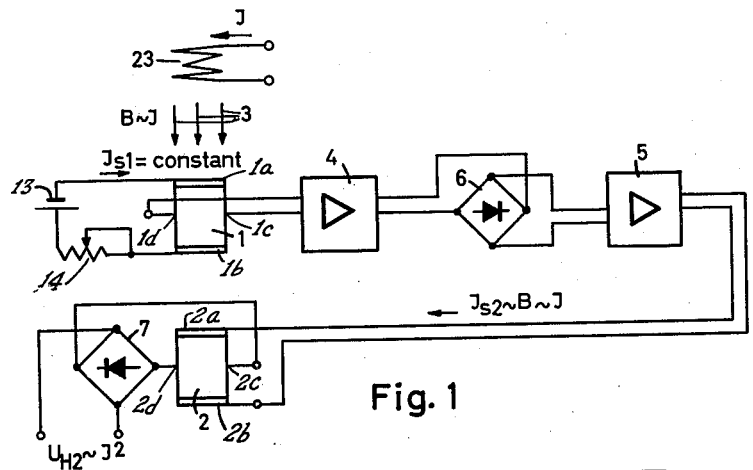
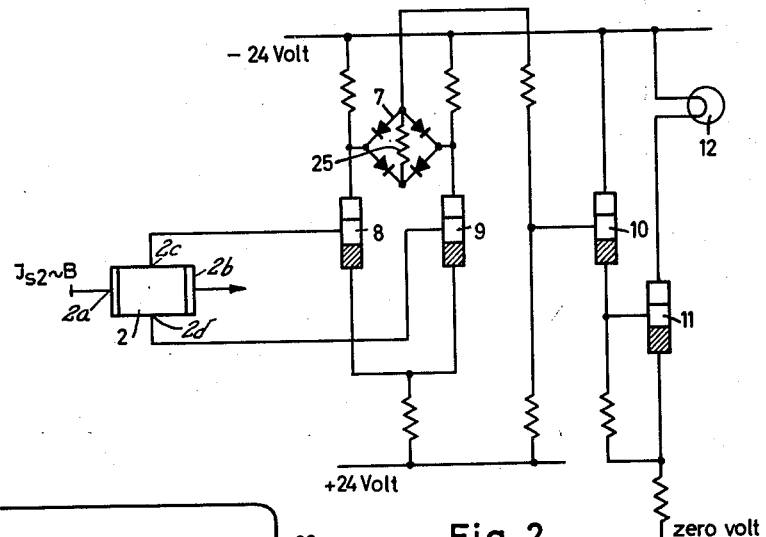
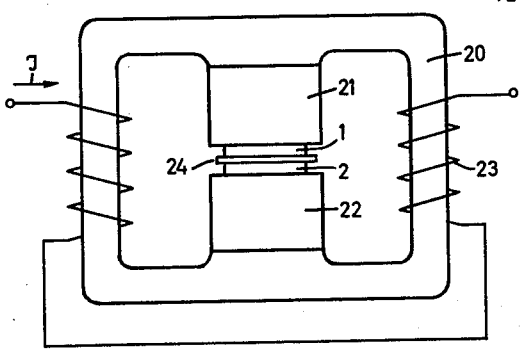
Fig. 1
Fig. 2
Fig. 3

My invention relates to an electric measuring device for computing, indicating, controlling, regulating or related purposes, which provides a voltage proportional to the square value of a current as is desired, for example, for measuring the effective (mean root square) value of a current flowing through a bus bar.

It is known to utilize the magnetic field of a current for measuring purposes and to employ magnetic-field responsive resistance devices or Hall-voltage generators for forming a voltage or other measuring magnitude-proportional, within certain limits, to the strength of the magnetic field and hence to the intensity of the current being responded to.

An object of my invention is to devise a magnetic-field responsive device capable of directly forming a voltage proportional to the square of the current with the aid of static-type components of utmost simplicity and reliability as compared with the current-measuring and squaring devices heretofore available. Another, subsidiary object is to simplify the amplifying components required in such a device.

According to the invention, I provide two Hall-voltage generators and subject both in substantially the same manner to the magnetic field of the current to be measured; and I excite one of the two Hall-voltage generators by a constant control current while deriving the control current of the second Hall generator from the output voltage of the first. The Hall voltage of the second generator then has the desired current-square proportional value.

According to another, preferred feature of my invention, the two semiconductor plates of the Hall-voltage generators are located in the field gap of a single magnetizable yoke, preferably a ferrite structure. This ensures that both Hall-voltage generators are always equally affected by the current-responsive magnetic field, thus providing for high accuracy of measurement.

According to still other features of my invention a rectifier bridge network is connected electrically behind each of the two Hall plates to be acted upon by the first and second Hall voltages respectively. This permits reducing the expenditure in material or space otherwise resulting from the use of symmetrical amplifiers between, or in connection with, the low-ohmic Hall-electrode circuits. By virtue of the preceding rectification, the end stages of the amplifiers, which may be simple direct-voltage wide-band amplifiers, need not be symmetrical.

The invention will be further explained with reference to the embodiments illustrated by way of example in the accompanying drawing in which:

FIG. 1 is a schematic circuit diagram of a square-value forming device;

FIG. 2 is a more detailed circuit diagram of one of the two groups of amplifying and rectifying components of the same device;

FIG. 3 shows schematically a front view of a field structure with two Hall generators for use in a device according to FIG. 1.

According to FIG. 1, two Hall plates 1 and 2 are located in a magnetic field indicated by arrows 3. The magnetic field strength B is, in good approximation, proportional to the field-exciting current J passing through a bus bar or, as schematically indicated in FIG. 1, through a magnetizing field coil 23. The Hall plates 1 and 2 may have the same mechanical and electrical dimensions and may consist, for example, of such crystalline semiconductor material as indium antimonide or indium arsenide, although other semiconductor substances such as germanium are likewise applicable. Each Hall plate carries two current supply terminals such as those denoted by 1a and 1b, by means of which a control current is passed through the semiconductor plated during operation of the device. Each Hall plate is further provided with two probe-type Hall electrodes, such as those denoted by 1c and 1d. These electrodes provide an output voltage proportional to the product of the magnetic field perpendicular to the plane defined by the Hall plate times the intensity of the control current passing through the plate.

The Hall plate 1 is supplied with a control current $J_{S1}$ of constant magnitude. This current is schematically shown to be supplied from a suitable current source 13 through an adjustable rheostat 14. The Hall voltage issuing from electrodes 1c and 1d is amplified and is impressed across the current supply terminals 2a and 2b of the second Hall plate 2 thus constituting the control current for the second plate. The amplifier comprises two stages 4 and 5 between which a rectifier bridge network 6 is located. The Hall voltage produced between the Hall electrodes 2c and 2d of the second Hall plate 2 can be supplied to an amplifier of similar electric design, only the bridge rectifier 7 of the second amplifying means being illustrated in FIG. 1. The Hall voltage $U_{H2}$ available from the second Hall plate 2, or the correspondingly amplified output voltage of the device, is proportional to the square of the current J which produces the magnetic field to which bottom Hall plates are subjected.

The details of an amplifier suitable for connection between the two Hall plates 1 and 2, or for connection to the Hall-electrode circuit of the Hall plate 2 is illustrated in FIG. 2, the particular amplifier shown being connected to the Hall electrodes of the Hall plate 2. The first stage of the amplifier is symmetrical. It comprises two transistors 8 and 9. The output of the first stage passes through the rectifier bridge network 7 to which the transistors 10 and 11 of the second amplifier stage are connected. The output of the second stage is applied to a measuring instrument 12 such as the measuring loop of a current-responsive oscillograph, this instrument being shown connected in the collector circuit of the transistor 11. Such an amplifier has the advantage that, while the input stage is symmetrical, the subsequent stages and particularly the end stage need not be symmetrical but may be given a simpler design and a smaller number of components.

FIG. 3 exemplifies an embodiment of a magnetic field device for subjecting the two Hall plates to the magnetic field of a current magnitude whose square value is to be formed.

According to FIG. 3, the device comprises two pole shoes 21 and 22 consisting preferably of ferrite and forming part of a magnetizable yoke 20. The two Hall plates 1 and 2 are located in the field gap between the pole shoes 21, 22 and are insulated from each other by an insert 24. The current J passes through a magnetizing coil 23 and produces the magnetic field to which both Hall plates are equally subjected.

The magnetizable structure may also be composed of two ferrite portions which when put together form a loop around a bus bar traversed by the current that produces a field in the gap in which the two Hall plates 1 and 2 are located. This device operates essentially as a direct-current transformer and, as explained, furnishes an output voltage proportional to the square of the current intensity in the bus bar.

If desired, two field structures, each comprising only one Hall plate, may be used so that both are excited by one and the same current. It is also possible to locate the two Hall plates side by side rather than one above the other in the magnetic field gap of the magnetizable structure.

The invention is generally applicable to sensing, measuring, indicating, recording, controlling, regulating or computing purposes in which a voltage proportional to the square of a current is desired. Thus, the invention can be used for measuring the efficiency of electric plants of any type. The invention is further applicable for the testing of drives such as in rolling mills, electric railroads or other propulsion systems, hoists, industrial testing equipment, circuit-breakers and other safety devices. A particular advantage is the elimination of the symmetrical amplifier otherwise necessary between the low-ohmic Hall generators; thus affording a reduction in the amount of material and space. It is preferable for the purposes of the invention to employ Hall plates of a semiconductor material having a relatively low specific resistance. For that reason, Hall plates of indium antimonide or indium arsenide are preferable to Hall plates of germanium. The use of such low-ohmic Hall plates, in conjunction with a symmetrical-input asymmetrical-output stage of amplification, permits obtaining a relatively great output voltage with the aid of extremely compact equipment.

I claim:

1. An electric measuring device for forming a measuring voltage proportional to the square of a current, comprising magnetic field means having a field responsive to the current and substantially proportional thereto, two Hall plates disposed in said field, each of said Hall plates having a pair of terminals and a pair of Hall-voltage electrodes, constant-current supply means connected to supply a substantially constant current to the terminals of one of said Hall plates, circuit means including rectifier means connecting the electrodes of said one of said Hall plates to the terminals of the other of said Hall plates to supply to said last-mentioned terminals a current proportional to the absolute value of the current to be squared, and output leads connected with the electrodes of the other of said Hall plates to provide said measuring voltage.

2. An electric measuring device for forming a measuring voltage proportional to the square of a current, comprising magnetic field means having a field responsive to the current and substantially proportional thereto, two Hall plates disposed in said field, each of said Hall plates having a pair of terminals and a pair of Hall-voltage electrodes, constant-current supply means connected to supply a substantially constant current to the terminals of one of said Hall plates, an amplifier connecting the electrodes of said one of said Hall plates with the terminals of the other of said other Hall plates, and another amplifier having an input circuit connected with the electrodes of said other of said Hall plates and having an output circuit to provide said measuring voltage, each of said two amplifiers comprising rectifier means to supply direct current to said other Hall plate and to said output circuit respectively.

3. An electric measuring device for forming a measuring voltage proportional to the square of a current, comprising a magnetizable yoke structure adapted to be inductively linked with the current and having a field gap to provide in said gap a field substantially proportional to the current, two Hall plates disposed in said gap to be both subjected to said field, each of said Hall plates having a pair of terminals and a pair of Hall-voltage electrodes, constant-current supply means connected to supply a substantially constant current to the terminals of one of said Hall plates, an amplifier connecting said electrodes of the one of said Hall plates with the terminals of the other of said Hall plates, and output leads connected with the electrodes of the other of said Hall plates to provide said measuring voltage, said amplifier having cascade-connected transistor stages of which the input stage is symmetrical and the end stage is asymmetrical, and a full-wave rectifier connected between said symmetrical and asymmetrical stages.

4. An electric measuring device for forming a measuring voltage proportional to the square of a current, comprising a loop-shaped ferrite structure adapted to be placed around a bus conductor for the current and having a field gap to provide in said gap a magnetic field substantially proportional to the bus current, two Hall plates disposed in said gap field, each of said plates having a pair of terminals and a pair of Hall-voltage electrodes, constant-current supply means connected to supply a substantially constant current to the terminals of one of said Hall plates, circuit means including rectifier means connecting the electrodes of said one of said Hall plates with the terminals of the other of said Hall plates to supply to said last-mentioned terminals a current proportional to the absolute value of the current to be squared, rectifier means having an input connected to the electrodes of the other of said Hall plates and an output and output leads connected to the output of said last-mentioned rectifier means to provide said measuring voltage.

References Cited by the Examiner

UNITED STATES PATENTS

| 1,778,795 | 10/30 | Craig | 324—45 |
| 2,550,492 | 4/51 | Millar | 235—194 |
| 2,585,707 | 2/52 | Warner | 235—194 |
| 2,767,911 | 10/56 | Hollingworth | 235—194 |
| 2,814,015 | 11/57 | Kuhrt | 324—45 |
| 3,003,698 | 10/61 | Kuhrt et al. | 235—196 |

MALCOLM A. MORRISON, *Primary Examiner.*

CORNELIUS D. ANGEL, *Examiner.*